2,772,276
Patented Nov. 27, 1956

2,772,276

BASIC ESTERS OF N-ARYL-N-(HETEROCYCLYL-ALKYL) CARBAMIC ACIDS AND SYNTHESES THEREOF

John W. Cusic, Skokie, Ill., assignor, by mesne assignments, to G. D. Searle & Co., Skokie, Ill., a corporation of Delaware No Drawing. Application March 16, 1953,
Serial No. 342,733

14 Claims. (Cl. 260—302)

This invention relates to basic esters of carbamic acids substituted by both a heterocyclylalkyl radical and an aryl-radical, to salts thereof and to methods of preparing such esters and salts. In particular this invention relates to basic esters of the following structural formula

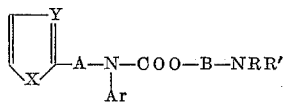

and salts thereof, wherein A and B are lower alkylene radicals; Ar is a monocyclic aryl hydrocarbon radical; X is a non-metallic element of periodic group VI; Y is a —CH— radical if X is oxygen or a member of the group consisting of CH and N radicals where X is sulfur; and NRR' is a non-aromatic amino radical.

The compounds which comprise this invention are useful as medicinal agents. They are potent spasmolytic and ganglion blocking agents. They are also effective in reducing hypertensive blood pressure levels. Further, they cause the release of adrenocorticotrophic hormone from the pituitary. It is the object of this invention to provide new chemical substances which are valuable in medicine and also to provide efficient and economical methods for preparing such substances.

The compounds of this invention may be used in the form of the free bases but preferably are used as acid addition or quaternary ammonium salts thereof. The salts are generally crystalline solids which are stable and are readily soluble in water. The salts therefore constitute a preferred embodiment of this invention.

In the foregoing structural formula the radical A represents a lower alkylene radical such as methylene, ethylene, propylene, butylene, amylene and hexylene as well as such polymethylenes as trimethylene, tetramethylene, pentamethylene and hexamethylene. The radical B is an alkylene radical of the same type with the exception that the oxygen and nitrogen atoms attached thereto must be separated by a minimum of two carbon atoms.

The radical Ar represents a monocyclic aryl hydrocarbon radical preferably containing 6 to 10 carbon atoms including phenyl and lower alkylphenyl radicals such as tolyl, xylyl, cumyl and diethylphenyl.

The amino radical NRR' represents secondary and tertiary amino radicals which are non-aromatic in character. It includes monoalkylamino radicals such as methylamino, ethylamino, propylamino, isopropylamino, butylamino, isobutylamino, secondary - butylamino, isoamylamino, hexylamino, isohexylamino, and related radicals. It also includes dialkylamino radicals such as dimethylamino, diethylamino, diamylamino, dihexylamino, diisohexylamino, methylpropylamino, methylbutylamino, ethylpropylamino, and similar radicals. The amino group, NRR' may contain substituted alkyl radicals such as β-hydroxyethyl, β-chloroethyl, γ-hydroxypropyl, β,γ-dihydroxypropyl, β-acetoxyethyl, carboethoxymethyl, β-carboethoxyethyl, β-carbomethoxypropyl, β-bromoethyl, γ-bromopropyl and the like. The amino radical, NRR' also includes non-aromatic heterocyclic amino radicals such as pyrrolidino, piperidino, morpholino, 4-methylpiperazino, lupetidino, pipecolino, methylpyrrolidino, dimethylpyrrolidino, and related saturated heterocyclic amino radicals.

The organic bases of the foregoing type form non-toxic salts with a variety of inorganic and strong organic acids including sulfuric, phosphoric, hydrochloric, hydrobromic, sulfamic, citric, lactic, maleic, malic, succinic, tartaric, cinnamic, acetic, benzoic, ascorbic, gluconic, and related acids. They also form non-toxic quaternary ammonium salts with a variety of organic esters of sulfuric, hydrohalic, and aromatic sulfonic acids. Among such esters are methyl chloride, ethyl chloride, propyl bromide, butyl chloride, isobutyl bromide, ethyl chloroacetate, β-bromoethyl acetate, methyl β-bromopropionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propylene chlorohydrin, γ-hydroxypropyl bromide, allyl chloride, methallyl chloride, crotyl bromide, chloroacetonitrite and the like.

The compounds of this invention are conveniently prepared from amines of the type

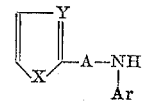

all symbols being defined as hereinabove. One of the preferred procedures for preparing these amines is the following. A mixture of 1 mole of an arylamine of the type Ar—NH₂ in 9 moles of dry benzene and 1 mole of potassium carbonate is heated to boiling and then treated with stirring by the gradual addition of a solution of 1 mole of a chloro compound of the structural formula

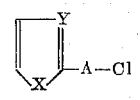

in benzene. The resulting mixture is agitated and heated at reflux temperature for about 4 hours and then treated with water. The aqueous layer is separated and extracted with ether whereupon the combined organic layers are washed with water and dried. The solvent and the unreacted starting material are removed by vacuum distillation.

The compounds of this invention can be prepared by reacting two or more equivalents of such an amine of the formula

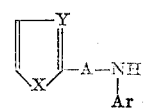

with one equivalent of a haloalkyl halocarbonate (also known as haloformate) of the formula

wherein Hal is a halogen atom of atomic number greater than 9 and includes chlorine, bromine, and iodine, and wherein B is a lower alkylene radical as defined hereinabove. This reaction is preferably carried out at low temperature (0–25° centigrade) in an inert solvent. The reaction can also be conducted in aqueous medium in the presence of caustic alkali, avoiding an excess of the amine. The resulting haloalkyl disubstituted carbamate has the formula

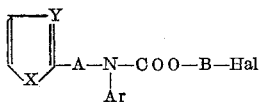

This halogenated ester is then reacted with two or more equivalents of a lower monoalkyl, dialkyl or saturated heterocyclic amine, generally at temperatures in the range of 50–150° C. The basic ester so formed is removed by conventional procedures and may be purified by vacuum distillation or by conversion to a crystalline salt.

The compounds of this invention may also be prepared by reacting a secondary amine of the formula

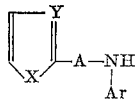

with phosgene in an inert solvent to form a disubstituted carbamyl chloride of the formula

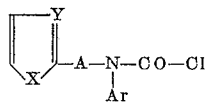

The latter is reacted with an imino alcohol of the formula

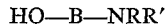

HO—B—NRR' generally in an inert solvent at temperatures in the range of 25–150° C.

The details of the experimental procedure and some of the material produced thereby will appear more fully from the following experimental part. It will be apparent to those skilled in the art that the examples of the procedures described therein can be varied by many modifications in materials and methods without departing from the invention and that the invention is not to be construed as limited thereby in spirit or in scope. In the following experimental part quantities of material are indicated in parts by weight, temperatures in degrees centigrade (°C.) and pressures in millimeters (mm.) of mercury.

*Example 1*

A stirred solution of 189 parts of phenyl-α-thenylamine in 800 parts of anhydrous benzene is treated by gradual addition with a solution of 71.5 parts of β-chloroethyl chlorocarbonate in 700 parts of anhydrous ether. After completion of the addition the mixture is stirred for several hours longer, then filtered and evaporated.

50 parts of β-chloroethyl α-thenylcarbanilate are dissolved in 80 parts of butanone and then heated with 40 parts of diethylamine and 2 parts of potassium iodide in a shielded pressure reactor at 80° C. for 5 days. After concentration on the steam bath the reaction mixture is extracted with dilute hydrochloric acid. The extract is rendered alkaline by addition of ammonium hydroxide. The resulting bases are extracted with ether and the ether extract is dried over anhydrous potassium carbonate, filtered and evaporated to yield the β-diethylaminoethyl α-thenylcarbanilate which is distilled at about 186–187° C. and 1 mm. pressure.

Treatment of an ether solution of this compound with a 25% solution of anhydrous hydrogen chloride in isopropanol yields a crystalline hydrochloride melting at about 78–80° C. This salt has the structural formula

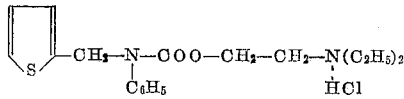

*Example 2*

Methyl bromide gas is passed into a solution of 8 parts of β-diethylaminoethyl α-thenylcarbanilate in 40 parts of butanone until 8 parts are absorbed. The mixture is kept at 0–5° C. for 12 hours. The precipitate of crystalline β-diethylaminoethyl α-thenylcarbanilate methobromide is removed and dried. It melts at 131–132° C. The compound has the structural formula

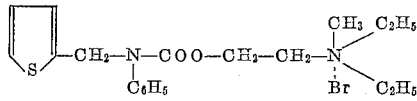

*Example 3*

A solution of 251 parts of α-thenylcarbanilyl chloride and 145 parts of ω-dimethylaminopentanol in 800 parts of butanone is heated at reflux temperature for 24 hours, concentrated and treated with ice and dilute hydrochloric acid. The aqueous layer is rendered alkaline by addition of potassium hydroxide and extracted with ether. This ether extract is washed with water, dried over anhydrous potassium carbonate, filtered and evaporated to yield the ω-dimethylaminopentyl α-thenylcarbanilate which is distilled at about 192–199° C. and 1 mm. pressure. It has the structural formula

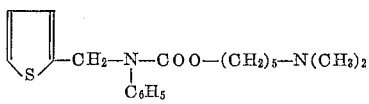

*Example 4*

135 parts of β-chloroethyl phenyl-α-thenyl-carbamate is refluxed for 12 hours with a solution of 105 parts of pyrrolidine and 6 parts of potassium iodide in 500 parts of butanone. The mixture is evaporated at 100° C. to remove solvent, and then treated with ice and dilute hydrochloric acid. The aqueous layer is separated, rendered alkaline by addition of sodium hydroxide and extracted with ether. This extract is dried over calcium sulfate, filtered and evaporated to yield the β-pyrrolidinoethyl α-thenylcarbanilate which distills at about 202–205° C. at 1 mm. pressure. It forms a crystalline hydrochloride which, after recrystallization from isopropanol, melts at 130–131° C.

*Example 5*

A solution of 11 parts β-pyrrolidinoethyl α-thenylcarbanilate and 19 parts of ethyl iodide in 60 parts of butanone is refluxed for 15 hours. The precipitate of β-pyrrolidinoethyl α-thenylcarbanilate ethiodide is separated and recrystallized from alcohol. It melts at 187–188° C. This salt has the structural formula

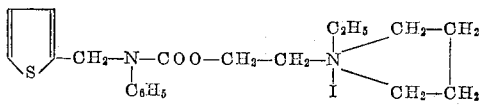

*Example 6*

A solution of 400 parts of phosgene in 2600 parts of anhydrous toluene is diluted with 4000 parts of cold ether and treated slowly with stirring and cooling with an ether solution of 1300 parts of 2-[β-(p-tolylaminoethyl)] theophene, freshly distilled at about 125–135° C. and 0.2–0.4 mm. pressure. The mixture is permitted to stand at room temperature for 10 hours and filtered. The filtrate is freed from solvents by distillation to obtain the p-methyl-N-[β-(2-thienyl)ethyl]carbanilyl chloride. A solution of 1400 parts of the residue and 710 parts of N-(β-hydroxy-ethyl)piperidine in 5000 parts of butanone is heated at reflux temperature for 2 days, concentrated and extracted with dilute hydrochloric acid. The extract is washed with ether, rendered alkaline by addition of sodium hydroxide and extracted with ether. This ether extract is dried over anhydrous potassium carbonate, filtered and evaporated to yield the piperidinoethyl p-methyl-N-[β-(2-thienyl)ethyl] carbanilate, which is distilled at about 220–230° C. and 0.7–0.8 mm. pressure. The compound has the structural formula

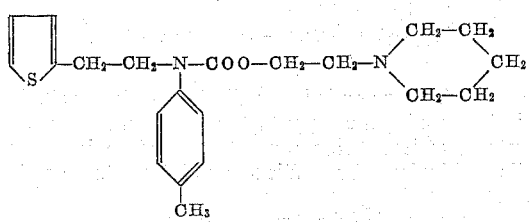

*Example 7*

A mixture of 144 parts of furfural, 140 parts of aniline, 400 parts of ethanol and 1.5 parts of Raney nickel is hydrogenated in a Parr bomb at about 40° C. and 400 pounds pressure in the course of 8 hours. The contents of the bomb are then filtered and the filtrate is freed from solvent by vacuum distillation. The N-(2-furylmethyl) aniline is purified by vacuum distillation at about 95–97° C. and 0.4 mm. pressure.

A solution of 40 parts of phosgene in 260 parts of anyhydrous toluene is diluted with 350 parts of cold, dry ether. The resulting solution is stirred in an ice bath and treated by gradual addition with a solution of 110 parts of N-(2-furylmethyl) aniline in 350 parts of ether. After standing at room temperature for 10 hours the precipitate is collected on a filter. The N-(2-furylmethyl)carbanilyl chloride is obtained upon concentration of the filtrate under vacuum.

A mixture of this product and 65 parts of N-(β-hydroxyethyl)diisopropylamine is dissolved in butanone and heated at reflux temperature for two days after which it is concentrated, acidified with hydrochloric acid and treated with ice and ether. The aqueous layer is separated, rendered alkaline by addition of dilute sodium hydroxide and extracted with ether. This ether extract is dried over anhydrous potassium carbonate, filtered and evaporated to yield the β-diisoproylaminoethyl ester of N-(2-furylmethyl)carbanilic acid, which is distilled at about 168–170° C. and 2 mm. pressure.

Treatment of an ether solution of this base with a 25% solution of anhydrous hydrogen chloride in isopropanol yields the hydrochloride as an oil which solidifies immediately. Recrystallized from a mixture of ethyl acetate and isopropanol this salt melts at about 143–145° C. It has the structural formula

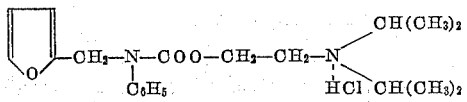

*Example 8*

A mixture of 10 parts of the β-diisopropylaminoethyl ester of N-(2-furylmethyl)carbanilic acid and 17.3 parts of bromomethane in 75 parts of chloroform is heated at 70° C. for 12–15 hours in a shielded pressure reactor. After concentration on the steam bath and cooling the reaction mixture is treated with ether, whereupon an oily precipitate forms which solidifies within a short time. Recrystallized from a mixture of butanone and isopropanol, the methobromide of the β-diisopropylaminoethyl ester of N-(2-furylmethyl)-carbanilic acid melts at about 131–133° C. It has the structural formula

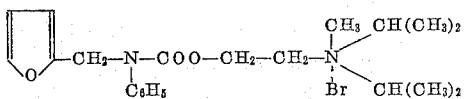

*Example 9*

A solution of 100 parts of phosgene in 625 parts of toluene is diluted with 900 parts of cold, dry ether, stirred in an ice bath and treated slowly with a solution of 342 parts of N-(2-furylethyl)-m,p-xylylamine in 900 parts of ether. After storage at 20° C. for 12 hours the precipitate is collected on a filter. The m,p-dimethyl-N-[β-(2-furyl)ethyl]carbanilyl chloride is obtained by concentration of the filtrate under vacuum. A mixture of 284 parts of this product and 115 parts of γ-hydroxypropyldimethylamine is dissolved in 2500 parts of toluene and heated at reflux temperature for 15 hours, cooled and extracted with dilute hydrochloric acid. The aqueous layer is washed with ether, rendered alkaline by addition of potassium hydroxide and extracted with ether. This ether extract is dried over anhydrous potassium carbonate, filtered and evaporated under vacuum to yield the γ-dimethylaminopropyl ester of N-(2-furylethyl)-m,p-dimethylcarbanilic acid, which is distilled at about 166–174° C. and 2 mm. pressure. It has the structural formula

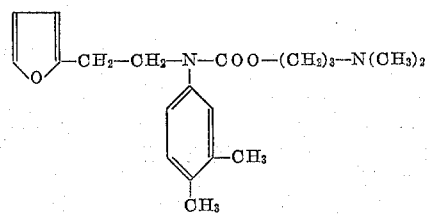

*Example 10*

To a solution of 271 parts of N-[δ-(2-furyl)butyl]-o,p-diethylaniline in 1200 parts of toluene maintained at 0° C. there is added slowly and with agitation a solution of 71 parts of β-chloroethyl chlorocarbonate in 700 parts of dry ether. The stirring is continued for several hours after which the mixture is filtered and the filtrate is evaporated. The residue of β-chloroethyl, o,p-diethyl-N-(δ-furylbutyl)carbanilate is refluxed for ten hours with a solution of 127 parts of morpholine in 600 parts of butanone. The reaction mixture is partially concentrated on the steam bath and then treated with ice, hydrochloric acid and ether. The aqueous layer is separated, washed with ether, rendered alkaline by addition of dilute ammonium hydroxide and extracted with ether. This extract is stirred with charcoal, dried over anhydrous potassium carbonate, filtered and evaporated to yield morpholinoethyl N-[δ-(2-furyl)butyl]-o,p-diethylcarbanilate as a high-boiling oil which has the structural formula

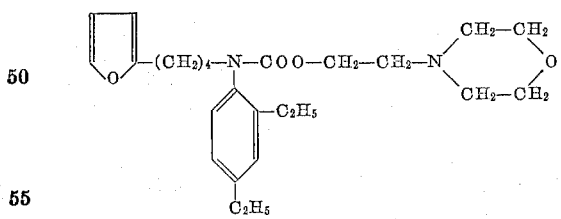

*Example 11*

A solution of 143 parts of β-chloroethyl chlorocarbonate in 1400 parts of dry ether is added slowly to an agitated solution of 346 parts of N-(2-furylmethyl)-p-methylaniline in 1600 parts of dry ether at 0° C. The mixture is agitated for four hours at 0° C. and then filtered. The filtrate is concentrated in vacuo.

50 parts of the β-chloroethyl N-(2-furylmethyl)-p-methylcarbanilate thus obtained are dissolved in 160 parts of butanone and then heated with 80 parts of n-butylamine and 4 parts of potassium iodide at 80° C. for 2 days. The reaction mixture is then cooled and concentrated under vacuum. The residue is mixed with ice, dilute hydrochloric acid and ether. The aqueous layer is separated, made alkaline by addition of sodium hydroxide and extracted with ether. The ether extract is dried over anhydrous sodium sulfate, filtered and evaporated to yield the β-butylaminoethyl ester of N-(2-furylmethyl)-p-methylcarbanilic acid which is distilled at about 158–165° C. and 2 mm. pressure. It has the structural formula

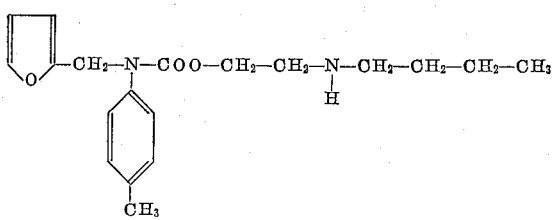

*Example 12*

A solution of 20 parts of phosgene in 130 parts of toluene is diluted with 175 parts of ether. The resulting mixture is agitated and treated at 0° C. by gradual addition with 60 parts of 2-anilinomethylthiazole in 200 parts of ether. After standing at room temperature for 8 hours the solution is filtered and the filtrate is concentrated to yield the N-(2-thiazolemethyl)carbanilyl chloride. A mixture of this product and 39 parts of di-(α-methylpropyl)aminoethanol is dissolved in butanone and heated at reflux temperature for 15 hours. The reaction mixture is concentrated and treated with ice, dilute hydrochloric acid and ether. The aqueous layer is washed with ether, rendered alkaline by addition of dilute sodium hydroxide and extracted with ether. This ether extract is dried over anhydrous potassium carbonate, stirred with charcoal, filtered and evaporated to yield the di-(α-methylpropyl)aminoethyl ester of N-(2-thiazole)methylcarbanilic acid as a high-boiling oil. The compound has the structural formula

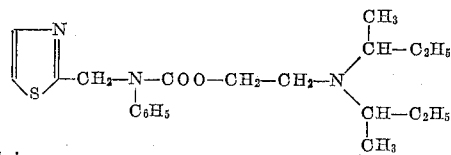

I claim:
1. A compound of the structural formula

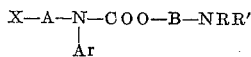

wherein A is a lower alkylene radical; B is a lower alkylene radical separating the oxygen and nitrogen atoms attached thereto by at least two carbon atoms; Ar is a monocyclic aryl hydrocarbon radical containing 6 to 10 carbon atoms; X is a member of the class consisting of furyl, thienyl and thiazolyl radicals; and NRR' is a member of the class consisting of mnoalkylamino, dialkylamino, pyrrolidino, piperidino and morpholino radicals.

2. A compound of the structural formula

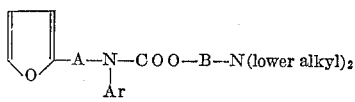

wherein A is a lower alkylene radical; B is a lower alkylene radical separating the oxygen and nitrogen atoms attached thereto by at least two carbon atoms; and Ar is a monocyclic aryl hydrocarbon radical containing 6 to 10 carbon atoms.

3. A compound of the structural formula

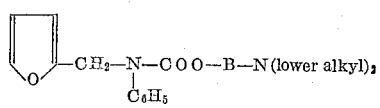

wherein B is a lower alkylene radical separating the oxygen and nitrogen atoms attached thereto by at least two carbon atoms.

4.

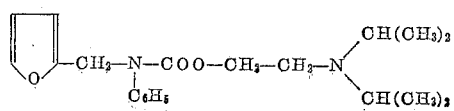

5. A compound of the structural formula

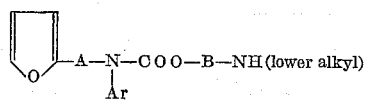

wherein A is a lower alkylene radical; B is a lower alkylene radical separating the oxygen and nitrogen atoms attached thereto by at least two carbon atoms; and Ar is a monocyclic aryl hydrocarbon radical containing 6 to 10 carbon atoms.

6. A compound of the structural formula

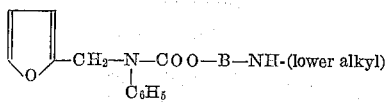

wherein B is a lower alkylene radical separating the oxygen and nitrogen atoms attached thereto by at least two carbon atoms.

7. A compound of the structural formula

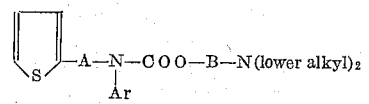

wherein A is a lower alkylene radical; B is a lower alkylene radical separating the oxygen and nitrogen atoms attached thereto by at least two carbon atoms; and Ar is a monocyclic aryl hydrocarbon radical containing 6 to 10 carbon atoms.

8. A compound of the structural formula

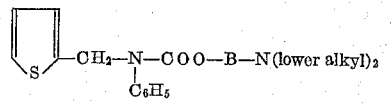

wherein B is a lower alkylene radical separating the oxygen and nitrogen atoms attached thereto by at least two carbon atoms.

9.

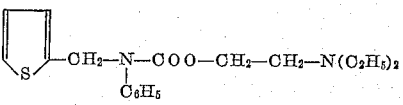

10. A compound of the structural formula

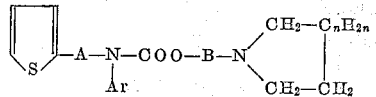

wherein A is a lower alkylene radical; B is a lower alkylene radical separating the oxygen and nitrogen atoms attached thereto by at least two carbon atoms; Ar is a monocyclic aryl hydrocarbon radical containing 6 to 10 carbon atoms; and *n* is a positive integer less than 3.

11. A compound of the structural formula

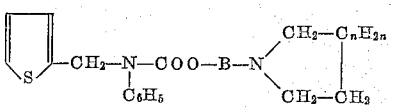

wherein B is a lower alkylene radical separating the oxygen and nitrogen atoms attached thereto by at least two carbon atoms and *n* is a positive integer less than 3.

12. A compound of the structural formula

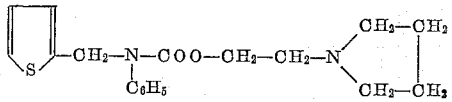

13. A compound of the structural formula

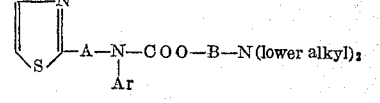

wherein A is a lower alkylene radical; B is a lower alkylene radical separating the oxygen and nitrogen atoms attached thereto by at least two carbon atoms; and Ar is a monocyclic aryl hydrocarbon radical containing 6 to 10 carbon atoms.

14. A compound of the structural formula

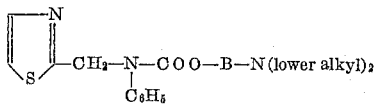

wherein B is a lower alkylene radical separating the oxygen and nitrogen atoms attached thereto by at least two carbon atoms.

References Cited in the file of this patent

JACS, vol. 58, pp. 1610–12 (1936).

Jour. Am. Pharm. Assoc., vol. XXXIII, pp. 193–204 (1944).